(12) United States Patent
Unno et al.

(10) Patent No.: US 12,272,108 B2
(45) Date of Patent: Apr. 8, 2025

(54) POINT CLOUD DECODING DEVICE, POINT CLOUD DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 110 days.

(21) Appl. No.: 18/118,866

(22) Filed: Mar. 8, 2023

(65) Prior Publication Data

US 2023/0222699 A1 Jul. 13, 2023

Related U.S. Application Data

(63) Continuation of application No. PCT/JP2021/035549, filed on Sep. 28, 2021.

(30) Foreign Application Priority Data

Sep. 29, 2020 (JP) ................................. 2020-164123

(51) Int. Cl.
*G06T 9/40* (2006.01)

(52) U.S. Cl.
CPC ....................................... *G06T 9/40* (2013.01)

(58) Field of Classification Search
CPC ...................................................... G06T 9/40
See application file for complete search history.

(56) References Cited

U.S. PATENT DOCUMENTS

| 10,693,492 B1* | 6/2020 | Lasserre ................ G06T 9/001 |
| 2015/0382016 A1 | 12/2015 | Cohen et al. |
| 2018/0176587 A1* | 6/2018 | Panusopone ......... H04N 19/176 |
| 2020/0320744 A1 | 10/2020 | Nakagami et al. |
| 2021/0297698 A1 | 9/2021 | Sugio et al. |
| 2021/0297699 A1 | 9/2021 | Iguchi et al. |
| 2021/0368186 A1 | 11/2021 | Sugio et al. |
| 2021/0383577 A1 | 12/2021 | Sugio et al. |
| 2022/0086444 A1 | 3/2022 | Piao et al. |
| 2022/0247997 A1 | 8/2022 | Abe et al. |

(Continued)

FOREIGN PATENT DOCUMENTS

| JP | 2017513305 A | 5/2017 |
| WO | 2014156707 A1 | 10/2014 |
| WO | 2019078000 A1 | 4/2019 |

(Continued)

OTHER PUBLICATIONS

International Search Report (ISR) (and English language translation thereof) dated Dec. 21, 2021, issued in International Application No. PCT/JP2021/035553.

(Continued)

*Primary Examiner* — Daniel F Hajnik
*Assistant Examiner* — Jed-Justin Imperial
(74) *Attorney, Agent, or Firm* — Holtz, Holtz & Volek PC

(57) ABSTRACT

A point cloud decoding device 200 according to the present invention includes: a geometry information decoding unit 2010 that decodes a first flag used to indicate whether or not to use a planar mode from a bit stream and recognizes the first flag as having an identical value to a case of failing to use the planar mode in a case of non-inclusion of the first flag in the bit stream.

4 Claims, 9 Drawing Sheets

(56) References Cited

U.S. PATENT DOCUMENTS

2022/0312036 A1 9/2022 Sugio et al.
2023/0353782 A1 11/2023 Iguchi et al.

FOREIGN PATENT DOCUMENTS

| WO | 2020130134 A1 | 6/2020 |
| WO | 2020138353 A1 | 7/2020 |
| WO | 2020162495 A1 | 8/2020 |
| WO | 2020184443 A1 | 9/2020 |
| WO | 2021079951 A1 | 4/2021 |

OTHER PUBLICATIONS

International Search Report (ISR) (and English language translation thereof) dated Jun. 29, 2021, issued in International Application No. PCT/JP2021/010068.
U.S. Appl. No. 18/118,880; First Named Inventor: Kyohei Unno; Title: "Point Cloud Decoding Device, Point Cloud Decoding Method, and Program"; Filed: Mar. 8, 2023.
U.S. Appl. No. 18/118,951; First Named Inventor: Kyohei Unno; Title: "Point Cloud Decoding Device, Point Cloud Decoding Method, and Program"; Filed: Mar. 8, 2023.
U.S. Appl. No. 18/118,969; First Named Inventor: Kyohei Unno; Title: "Point Cloud Decoding Device, Point Cloud Decoding Method, and Program"; Filed: Mar. 8, 2023.
Written Opinion dated Dec. 21, 2021, issued in International Application No. PCT/JP2021/035553.
Written Opinion dated Jun. 29, 2021, issued in International Application No. PCT/JP2021/010068.
International Search Report (ISR) (and English language translation thereof) dated Dec. 21, 2021, issued in International Application No. PCT/JP2021/035551.
Written Opinion dated Dec. 21, 2021, issued in International Application No. PCT/JP2021/035551.
Helmrich, et al., "CE7-related: Joint chroma residual coding with multiple modes", Joint Video Experts Team (JVET) of ITU-T SG 16 WP3 and ISO/IEC JTC 1/SC 29/WG 11, JVET-NO282-v3, pp. 1-10, 14th Meeting: Geneva, CH, Mar. 2019.
"G-PCC Future Enhancement", ISO/IEC/ JTC1/SC29/WG11 N19328, 2020.
International Search Report (ISR) (and English language translation thereof) dated Dec. 21, 2021, issued in International Application No. PCT/JP2021/035549.
Written Opinion dated Dec. 21, 2021, issued in International Application No. PCT/JP2021/035549.
International Search Report (ISR) (and English translation thereof) dated Feb. 15, 2022, issued in International Application No. PCT/JP2021/044263.
Written Opinion dated Feb. 15, 2022, issued in International Application No. PCT/JP2021/044263.
"G-PCC Future Enhancements", ISO/IEC JTC 1/SC 29/WG 11; N19328, 2020.
Japanese Office Action (and an English language translation thereof) dated May 28, 2024, issued in Japanese Application No. 2020-164129 (which is a counterpart of related U.S. Appl. No. 18/118,969).
Related U.S. Appl. No. 18/212,184, First Named Inventor: Kyohei Unno; Title: "Point Cloud Decoding Device, Point Cloud Decoding Method, and Program"; Filed: Jun. 21, 2023.
Dricot, et al., "Adaptive Multi-level Triangle Soup for Geometry-based Point Cloud 1-7 Coding", 2019 IEEE 21st International Workshop on Multimedia Signal Processing (MMSP). Nov. 18, 2019; https://ieeexplore.ieee.org/document/8901791.
Office Action (Non-Final Rejection) dated Dec. 19, 2024, issued in related U.S. Appl. No. 18/118,880.

* cited by examiner

FIG. 4

| geometry_parameter_set( ) { | Descriptor |
|---|---|
|   gps_geom_parameter_set_id | ue(v) |
|   ... | |
|   geom_tree_type | u(1) |
|   if(geom_tree_type == 0 ){ | |
|     trisoup_enabled_flag | u(1) |
|     if( !trisoup_enabled_flag ) | |
|       inferred_direct_coding_mode_enabled_flag | u(1) |
|       geom_tree_coded_axis_list_present_flag | u(1) |
|       geometry_planar_mode_flag | u(1) |
|   } | |
|   geometry_angular_mode_flag | u(1) |
|   if( geometry_angular_mode_flag ){ | |
|     if( geometry_planar_mode_flag ) | |
|       planar_buffer_disabled_flag | u(1) |
|   } | |
|   geom_scaling_enabled_flag | u(1) |
|   if( geom_scaling_enabled_flag ) { | |
|     geom_base_qp | ue(v) |
|     if( geom_tree_type = = 1 ) | |
|       geom_qp_offset_intvl_log2 | ue(v) |
|     else if( inferred_direct_coding_mode_enabled_flag ) | |
|       geom_direct_coding_mode_qp_offset | se(v) |
|   } | |
|   ... | |
| } | |

FIG. 5

| geometry_data_unit_header( ) { | Descriptor |
|---|---|
|    gsh_geometry_parameter_set_id | ue(v) |
|    if( geom_tree_type = = 0 ) { | |
|       geom_tree_depth_minus1 | ue(v) |
|    } | |
|    if( geom_scaling_enabled_flag ) { | |
|       geom_slice_qp_offset | se(v) |
|       if( geom_tree_type = = 0 ) | |
|          geom_octree_qp_offsets_depth | ue(v) |
|    } | |
|    if( trisoup_enabled_flag ) { | |
|       log2_trisoup_node_size | ue(v) |
|    } | |
|    ... | |
| } | |

FIG. 8

| seq_parameter_set( ) { | Descriptor |
|---|---|
|     level_idc | u(8) |
|     sps_seq_parameter_set_id | ue(v) |
|     sps_num_attribute_sets | ue(v) |
|     for( i = 0; i < sps_num_attribute_sets; i++ ) | |
|         attribute_dimension_minus1[ i ] | ue(v) |
|     ... | |
| } | |

FIG. 9

| attribute_parameter_set( ) { | Descriptor |
|---|---|
|    aps_attr_parameter_set_id | ue(v) |
|    aps_seq_parameter_set_id | ue(v) |
|    attr_coding_type | ue(v) |
|    if ( attr_secondary_dim_present_flag ) | |
|       aps_attr_chroma_qp_offset | se(v) |
|    if (attr_secondary_dim_present_flag && attr_coding_type == 2 ) | |
|       lifting_last_component_prediction_enabled_flag | u(1) |
|    lifting_scalability_enabled_flag | u(1) |
|    if ( !lifting_scalability_enabled_flag ){ | |
|       lifting_num_detail_levels_minus1 | ue(v) |
|       if ( lifting_num_detail_levels_minus1 > 0 ) { | |
|          lifting_lod_regular_sampling_enabled_flag | u(1) |
|          for( idx = 0; idx <= num_detail_levels_minus1; idx++ ) { | |
|             if ( lifting_lod_regular_sampling_enabled_flag ) | |
|             lifting_sampling_period_minus2[ idx ] | ue(v) |
|          } | |
|       } | |
|    } | |
|    if(attr_secondary_dim_present_flag && attr_coding_type == 1 ) | |
|       inter_component_prediction_enabled_flag | u(1) |
|    ... | |
| } | |

POINT CLOUD DECODING DEVICE, POINT CLOUD DECODING METHOD, AND PROGRAM

CROSS-REFERENCE TO RELATED APPLICATIONS

The present application is a continuation of PCT Application No. PCT/JP2021/035549, filed on Sep. 28, 2021, which claims the benefit of Japanese patent application No. 2020-164123 filed on Sep. 29, 2020, the entire contents of which are incorporated herein by reference in its entirety.

TECHNICAL FIELD

The present invention relates to a point cloud decoding device, a point cloud decoding method, and a program.

BACKGROUND ART

Non Patent Literature 1 discloses a technique to perform the nearest neighbor node search using a buffer in decoding information regarding a planar mode.

CITATION LIST

Non Patent Literature

Non patent Literature 1: G-PCC Future Enhancement, ISO/IEC/JTC1/SC29/WG11 N19328

SUMMARY OF INVENTION

Technical Problem

However, in Non Patent Literature 1, even a flag used to control whether or not to perform the nearest neighbor node search using a buffer has need to be decoded in decoding information regarding a planar mode regardless of whether the planar mode is used or not.

Thus, the present invention is made in view of the challenge mentioned above and intended to provide a point cloud decoding device, point cloud decoding method, and program, capable of avoiding unnecessary decoding of the syntax, reducing the bit rate.

Solution to Problem

A first aspect of the present invention is summarized as a point cloud decoding device, including: a geometry information decoding unit that decodes a first flag used to indicate whether or not to use a planar mode from a bit stream and recognizes the first flag as having an identical value to a case of failing to use the planar mode in a case of non-inclusion of the first flag in the bit stream.

A second aspect of the present invention is summarized as a point cloud decoding method, including the steps of: decoding a first flag used to indicate whether or not to use a planar mode from a bit stream; and recognizing the first flag as having an identical value to a case of failing to use the planar mode in a case of non-inclusion of the first flag in the bit stream.

A third aspect of the present invention is summarized as a program used in a point cloud decoding device to cause a computer to execute the steps of: decoding a first flag used to indicate whether or not to use a planar mode from a bit stream; and recognizing the first flag as having an identical value to a case of failing to use the planar mode in a case of non-inclusion of the first flag in the bit stream.

Advantageous Effects of Invention

According to the present invention, it is possible to provide a point cloud decoding device, point cloud decoding method, and program, capable of avoiding unnecessary decoding of the syntax, reducing the bit rate.

BRIEF DESCRIPTION OF DRAWINGS

FIG. 4 is an example of a syntax configuration of GPS 2011 according to the embodiment.

FIG. 5 is an exemplary syntax configuration of GSHs 2012A and 2012B according to the embodiment.

FIG. 8 is an example of a syntax configuration of SPS 2001 according to the embodiment.

FIG. 9 is an example of a syntax configuration of APS 2061 according to the embodiment.

DESCRIPTION OF EMBODIMENTS

An embodiment of the present invention will be explained hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
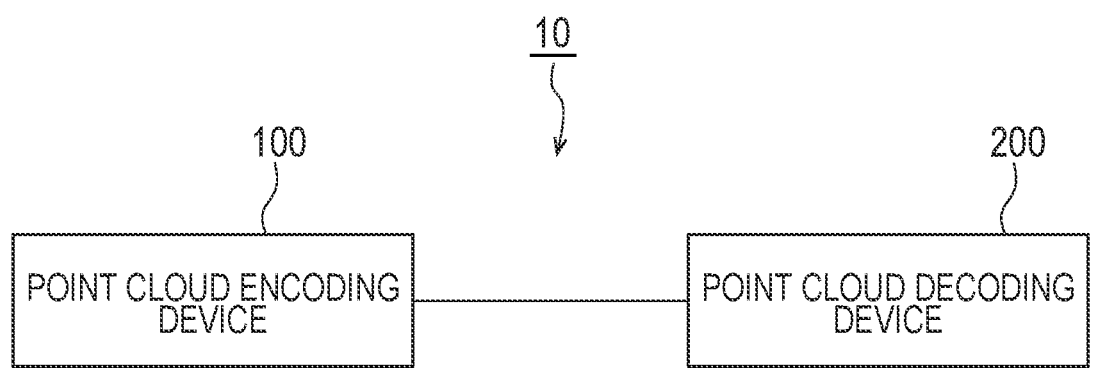
FIG. 1 is a diagram illustrating an example of a configuration of a point cloud processing system 10 according to an embodiment.

Hereinafter, with reference to FIG. 1 to FIG. 9, a point cloud processing system 10 according to a first embodiment of the present invention will be described. FIG. 1 is a diagram illustrating the point cloud processing system 10 according to an embodiment according to the present embodiment.

As illustrated in FIG. 1, the point cloud processing system 10 has a point cloud encoding device 100 and a point cloud decoding device 200.

The point cloud encoding device 100 is configured to generate encoded data (bit stream) by encoding input point cloud signals. The point cloud decoding device 200 is configured to generate output point cloud signals by decoding the bit stream.

Note that the input point cloud signals and the output point cloud signals include position information and attribute information of points in point clouds. The attribute information is, for example, color information or a reflection ratio of each point.

Herein, the bit stream may be transmitted from the point cloud encoding device 100 to the point cloud decoding device 200 via a transmission path. The bit stream may be stored in a storage medium and then provided from the point cloud encoding device 100 to the point cloud decoding device 200.

(Point Cloud Decoding Device 200)

Figure 2:
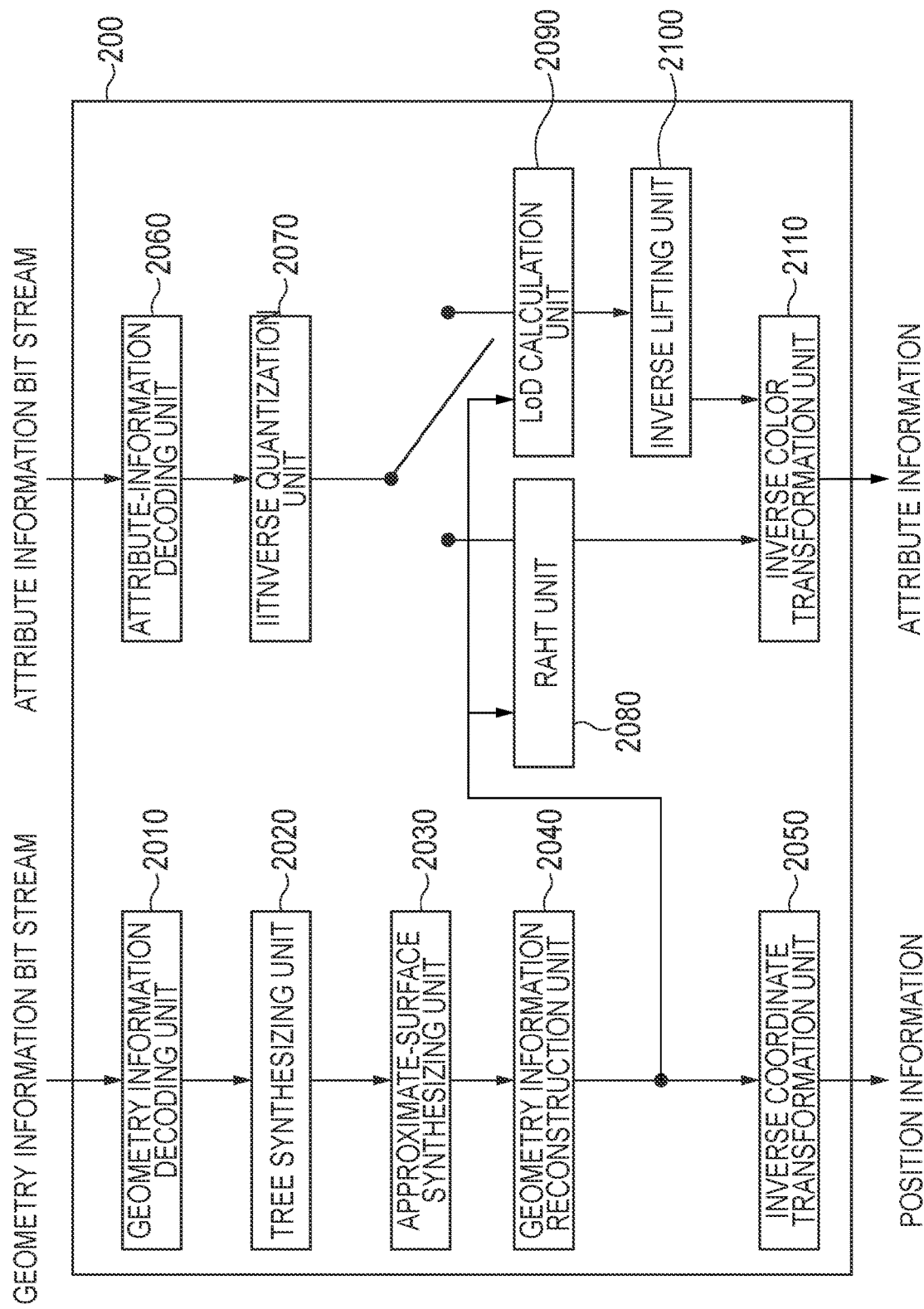
FIG. 2 is a diagram illustrating an example of functional blocks of a point cloud decoding device 200 according to the embodiment.

Hereinafter, with reference to FIG. 2, the point cloud decoding device 200 according to the present embodiment will be described. FIG. 2 is a diagram illustrating an example of functional blocks of the point cloud decoding device 200 according to the present embodiment.

As illustrated in FIG. 2, the point cloud decoding device 200 has a geometry information decoding unit 2010, a tree synthesizing unit 2020, an approximate-surface synthesizing unit 2030, a geometry information reconstruction unit 2040, an inverse coordinate transformation unit 2050, an attribute-information decoding unit 2060, an inverse quantization unit 2070, a RAHT unit 2080, a LoD calculation unit 2090, an inverse lifting unit 2100, and an inverse color transformation unit 2110.

The geometry information decoding unit 2010 is configured to use, as input, a bit stream about geometry information (geometry information bit stream) among bit streams output from the point cloud encoding device 100 and to decode syntax.

A decoding process is, for example, a context-adaptive binary arithmetic decoding process. Herein, for example, the syntax includes control data (flags and parameters) for controlling the decoding process of the position information.

The tree synthesizing unit 2020 is configured to use, as input, control data, which has been decoded by the geometry information decoding unit 2010, and later-described occupancy code that shows on which nodes in a tree a point cloud is present and to generate tree information about in which regions in a decoding target space points are present.

The present process can generate the tree information by recursively repeating a process of sectioning the decoding target space by cuboids, determining whether the points are present in each cuboid by referencing the occupancy code, dividing the cuboid in which the points are present into plural cuboids, and referencing the occupancy code.

In the present embodiment, there can be used a method called "Octree" in which octree division is recursively carried out with the above described cuboids always as cubes and a method called "QtBt" in which quadtree division and binary tree division are carried out in addition to octree division. Whether or not "QtBt" is to be used is transmitted as the control data from the point cloud encoding device 100 side.

Alternatively, in a case where the control data specifies that later-described Predictive coding is to be used, the tree synthesizing unit 2020 is configured to decode the coordinates of each point, based on a tree configuration determined in the point cloud encoding device 100.

The approximate-surface synthesizing unit 2030 is configured to generate approximate-surface information by using the tree information generated by the tree-information synthesizing unit 2020.

In a case where point clouds are densely distributed on a surface of an object, for example, when three-dimensional point cloud data of the object is to be decoded, the approximate-surface information approximates and expresses the region in which the point clouds are present by a small flat surface instead of decoding the individual point clouds.

Specifically, the approximate-surface synthesizing unit 2030 can generate the approximate-surface information, for example, by a method called "Trisoup". As specific processes of "Trisoup", for example, the methods described in Non Patent Literature 1 can be used. When sparse point cloud data acquired by Lidar or the like is to be decoded, the present process can be omitted.

The geometry information reconstruction unit 2040 is configured to reconfigure the geometry information of each point of the decoding-target point cloud (position information in a coordinate system assumed by the decoding process) based on the tree information generated by the tree-information synthesizing unit 2020 and the approximate-surface information generated by the approximate-surface synthesizing unit 2030.

The inverse coordinate transformation unit 2050 is configured to use the geometry information, which has been reconfigured by the geometry information reconstruction unit 2040, as input, to transform the coordinate system assumed by the decoding process to a coordinate system of the output point cloud signals, and to output the position information.

The attribute-information decoding unit 2060 is configured to use, as input, a bit stream about the attribute information (attribute-information bit stream) among bit streams output from the point cloud encoding device 100 and to decode syntax.

A decoding process is, for example, a context-adaptive binary arithmetic decoding process. Herein, for example, the syntax includes control data (flags and parameters) for controlling the decoding process of the attribute information.

The attribute-information decoding unit 2060 is configured to decode quantized residual information from the decoded syntax.

The inverse quantization unit 2070 is configured to carry out an inverse quantization process and generate inverse-quantized residual information based on quantized residual information decoded by the attribute-information decoding unit 2060 and a quantization parameter which is part of the control data decoded by the attribute-information decoding unit 2060.

The inverse-quantized residual information is output to either one of the RAHT unit 2080 and LoD calculation unit 2090 depending on characteristics of the point cloud serving as a decoding target. The control data decoded by the attribute-information decoding unit 2060 specifies to which one the information is to be output.

The RAHT unit 2080 is configured to use, as input, the inverse-quantized residual information generated by the inverse-quantized residual information and the geometry information generated by the geometry information reconstruction unit 2040 and to decode the attribute information of each point by using one type of Haar transformation (in a decoding process, inverse Haar transformation) called Region Adaptive Hierarchical Transform (RAHT). As specific processes of RAHT, for example, the methods described in Non Patent Literature 1 can be used.

The LoD calculation unit 2090 is configured to use the geometry information, which has been generated by the geometry information reconstruction unit 2040, as input and to generate Level of Detail (LoD).

LoD is the information for defining a reference relation (referencing point and point to be referenced) for realizing prediction encoding which predicts, from the attribute information of a certain point, the attribute information of another point and encodes or decodes prediction residual.

In other words, LoD is the information defining a hierarchical structure which categorizes the points included in the geometry information into plural levels and encodes or decodes the attributes of the point belonging to a lower level by using the attribute information of the point which belongs to a higher level.

As specific methods of determining LoD, for example, the methods described in Non Patent Literature 1 may be used. Other examples will be described later.

The inverse lifting unit 2100 is configured to decode the attribute information of each point based on the hierarchical structure defined by LoD by using the LoD generated by the LoD calculation unit 2090 and the inverse-quantized residual information generated by the inverse-quantized residual information. As specific processes of the inverse lifting, for example, the methods described in Non Patent Literature 1 can be used.

The inverse color transformation unit 2110 is configured to subject the attribute information, which is output from the RAHT unit 2080 or the inverse lifting unit 2100, to an inverse color transformation process when the attribute information of the decoding target is color information and when color transformation has been carried out on the point cloud encoding device 100 side. Whether to execute the inverse color transformation process or not is determined by the control data decoded by the attribute-information decoding unit 2060.

The point cloud decoding device 200 is configured to decode and output the attribute information of each point in the point cloud by the above described processes.

(Geometry Information Decoding Unit 2010)

Hereinafter, the control data decoded by the geometry information decoding unit 2010 will be described by using FIG. 3 to FIG. 5.

Figure 3:
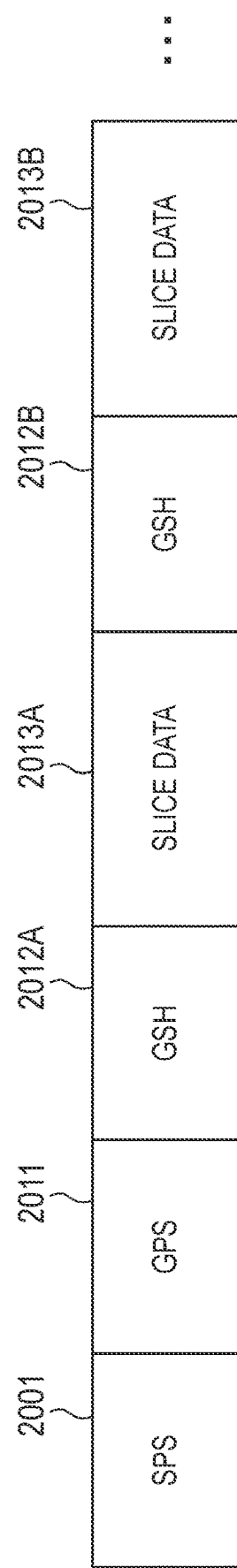
FIG. 3 is a configuration example of encoded data (bit stream) received by a geometry information decoding unit 2010 of the point cloud decoding device 200 according to the embodiment.

FIG. 3 is a configuration example of the encoded data (bit stream) received by the geometry information decoding unit 2010.

First, the bit stream may include GPS 2011. The GPS 2011 is also called a geometry parameter set and is an aggregate of the control data about decoding of geometry information. A specific example will be described later. Each GPS 2011 includes at least GPS id information for individual identification in a case where plural pieces of GPS 2011 are present.

Secondly, the bit stream may include GSH 2012A/2012B. The GSH 2012A/2012B are also called geometry slice headers and are aggregates of the control data corresponding to later-described slices. In the following description, the term "slice" is used. The slice can be regarded as a data unit. A specific example will be described later. The GSH 2012A/2012B includes at least GPS id information for specifying the GPS 2011 corresponding to the GSH 2012A/2012B.

Thirdly, the bit stream may include slice data 2013A/2013B subsequent to the GSH 2012A/2012B. The slice data 2013A/2013B includes encoded data of geometry information. An example of the slice data 2013A/2013B is later-described occupancy code.

As described above, the bit stream is configured so that the respective GSH 2012A/2012B and the GPS 2011 correspond to each slice data 2013A/2013B.

As described above, since which GPS 2011 is to be referenced is specified by the GPS id information in the GSH 2012A/2012B, the common GPS 2011 can be used for the plural pieces of slice data 2013A/2013B.

In other words, the GPS 2011 is not always required to be transmitted for each slice. For example, the bit stream can be configured so that the GPS 2011 is not encoded immediately anterior to the GSH 2012B and the slice data 2013B like FIG. 3.

Note that the configuration of FIG. 3 is merely an example. As long as the GSH 2012A/2012B and the GPS 2011 are configured to correspond to each slice data 2013A/2013B, an element(s) other than those described above may be added as a constituent element(s) of the bit stream. For example, the bit stream may include a sequence parameter set (SPS). Similarly, for transmission, the bit stream may be formed into a configuration different from that of FIG. 3. Furthermore, the bit stream may be synthesized with the bit stream, which is decoded by the later-described attribute-information decoding unit 2060, and transmitted as a single bit stream.

FIG. 4 is an example of a syntax configuration of the GPS 2011.

Note that syntax names in the following description are just exemplary. The syntax names may each vary as long as the corresponding function of syntax described below is achieved.

The GPS 2011 may include GPS id information (gps_geom_parameter_set_id) for identifying each GPS 2011.

Note that the Descriptor section of FIG. 4 indicates how each piece of syntax is encoded. ue(v) represents an unsigned 0-th order Exponential-Golomb code, and u(1) represents a 1-bit flag.

The GPS 2011 can include a flag used to control whether or not to use the predictive coding (geom_tree_type) in the tree synthesizing unit 2020.

In one example, the definition can be given such that the predictive coding is used if a value of geom_tree_type is "1", and the predictive coding is not used if the value of geom_tree_type is "0" and instead "Octree" is used (including a case of using "QtBt").

The GPS 2011 can include a flag used to control whether Trisoup is used or not (trisoup_enabled_flag) in the approximate-surface synthesizing unit 2030.

In one example, the definition can be given such that Trisoup is used if a value of trisoup_enabled_flag is "1", and Trisoup is not used if the value of trisoup_enabled_flag is "0".

The GPS 2011 can further include a flag used to control whether or not to use the direct coding mode (inferred_direct_coding_mode_enabled_flag) in the case where Trisoup is not used, i.e., if the value of trisoup_enabled_flag is "0".

In one example, the definition can be given such that Direct coding mode is used if a value of inferred_direct_coding_mode_enabled_flag is "1", and Direct coding mode is not used if the value of inferred_direct_coding_mode_enabled_flag is "0".

The GPS 2011 may include a flag (geom_tree_coded_axis_list_present_flag) for control of whether or not the tree synthesizing unit 2020 carries out "QtBt".

For example, it may be defined that, when a value of geom_tree_coded_axis_list_present_flag is "1", "QtBt" is carried out, and it may be defined that, when the value of geom_tree_coded_axis_list_present_flag is "0", only "Octree" is carried out.

Alternatively, it may be defined that, when the value of geom_tree_coded_axis_list_present_flag is "1", a cuboid is allowable as the node shape in addition to a cube (namely, "QtBt" is also used), and it may be defined that, when the value of geom_tree_coded_axis_list_present_flag is "0", only a cuboid is allowed as the node shape (namely, only "Octree" is carried out).

The above described definitions are not limiting, and control of whether or not "QtBt" is available is required to be defined.

The GPS 2011 may include a flag for control of whether or not to use the Planar mode (geometry_planar_mode_flag) in the tree synthesizing unit 2020.

In one example, the definition can be given such that Planar mode is used if a value of geometry_planar_mode_flag is "1", and Planar mode is not used if the value of geometry_planar_mode_flag is "0".

No inclusion of geometry_planar_mode_flag can cause the geometry information decoding unit 2010 to recognize the value of geometry_planar_mode_flag as "0", that is, not to use the planar mode.

Moreover, the definition can be given such that trisoup_enabled_flag, inferred_direct_coding_mode_enabled_flag, geometry_planar_mode_flag, and geom_tree_coded_axis_list_present_flag are decoded only in the case where the predictive coding is not used.

The GPS 2011 can include a flag used to control whether or not to use the angular mode (geometry_angular_mode_flag).

In one example, the definition can be given such that Angular mode is used if a value of geometry_angular_mode_flag is "1", and Angular mode is not used if the value of geometry_angular_mode_flag is "0".

The GPS 2011 can further include planar_buffer_disabled_flag in the case where the angular mode is used and the planar mode is used.

The definition can be given herein such that the nearest neighbor node search using a buffer is performed in decoding information regarding the planar mode if a value of planar_buffer_disabled_flag is "0".

On the other hand, the definition can be given herein such that the nearest neighbor node search using a buffer is not performed in decoding information regarding the planar mode if the value of planar_buffer_disabled_flag is "1".

The geometry information decoding unit 2010 can recognize the value of planar_buffer_disabled_flag as "1" if planar_buffer_disabled_flag is not included. In other words, in this case, the nearest neighbor node search using a buffer may not be performed in decoding information regarding the planar mode.

The specific operation in the case where the value of planar_buffer_disabled_flag is "0", that is, the nearest neighbor node search using a buffer in decoding information regarding the planar mode is performed can be same or similar to that described in, for example, Non Patent Literature 1.

As described above, it is possible to decode the flag indicating whether or not to use the planar mode from the bit stream, and if the flag is not included in the bit stream, recognize the value of the flag as the same value as the case where the planar mode is not used.

Such a configuration makes it possible to define no use of the planar mode explicitly even if the flag indicating whether or not to use the planar mode is not decoded, for example, the predictive coding is used (the case where the value of geom_tree_type is "1"), preventing any unintended or inadvertent malfunctions (probable execution of some processing operations relating to the planar mode even if the predictive coding is used).

Further, as described above, in the case where the flag indicating whether or not to use the planar mode represents that the planar mode is to be used, it is possible to decode the flag used to control whether or not the nearest neighbor node search using a buffer is performed in decoding the information regarding the planar mode.

Such a configuration makes it possible not to decode the flag used to control whether or not the nearest neighbor node search using a buffer is performed in decoding the information regarding the planar mode under a single condition in both the case where the planar mode is not used, i.e., the value of geom_tree_type is "1" and the case where the value of geom_tree_type is "0" and the value of geometry_planar_mode_flag is "0", making it possible to reduce the bit rate of GPS and the amount of data processed regarding the decoding.

Further, as described above, in the case where the flag used to control whether or not the nearest neighbor node search using a buffer is performed in decoding the information regarding the planar mode is not decoded, it is also possible to recognize the value of the flag as being identical to the case where the nearest neighbor node search using a buffer is not performed in decoding the information regarding the planar mode.

Such a configuration makes it possible to explicitly define that the nearest neighbor node search using a buffer is not performed in decoding the information regarding the planar mode, preventing any unintended or inadvertent malfunctions.

The GPS 2011 can include a flag used to control whether or not to carry out quantization (inverse quantization in terms of decoding) of position information (geom_scaling_enabled_flag). In one example, the definition can be given such that the inverse quantization is carried out if a value of geom_scaling_enabled_flag is "1" and the inverse quantization is not carried out if the value of geom_scaling_enabled_flag is "0".

The GPS 2011, in the case where the inverse quantization is carried out, can further include the syntax indicating the base value of a quantization parameter (QP) in carrying out the inverse quantization (geom_base_qp), for example, in the case of the value of geom_scaling_enabled_flag of "1". The definition can be given such that the value is recognized as "0" if the GPS 2011 does not include geom_base_qp.

The GPS 2011, in the case where the inverse quantization is carried out, can further include geom_qp_multiplier_log 2, for example, in the case of the value of geom_scaling_enabled_flag of "1". The value of the syntax can be defined to represent any integer value of 0 to 3. An example of using this syntax will be described later.

In the case where the inverse quantization is carried out and the predictive coding is used, i.e., for example, the value of geom_scaling_enabled_flag is "1" and the value of geom_tree_type is "1", the GPS 2011 can further include syntax used to define the interval for transmitting an offset value of the quantization parameter (geom_qp_offset_intvl_log 2). The range of possible values of this syntax can include a constraint of being zero or more values. In addition, the range of possible values of this syntax can include a constraint that the number of nodes included in one slice (a single data unit) defined for each profile or level is equal to or less than the maximum value (e.g., "Max points in a slice" disclosed in Non Patent Literature 1). In addition, in the case where geom_qp_offset_intvl_log 2 is a value obtained by using a base-2 logarithm for the actual transmission interval, the maximum value can be a value obtained by using the base-2 logarithm for "Max points in a slice", for example.

Further, the following clipping processing can be performed, after decoding the syntax, in such a way that a value of geom_qp_offset_intvl_log 2 is equal to or more than "0" and equal to or less than the value obtained by using the base-2 logarithm for "Max points in a slice".

geom_qp_offset_intvl_log 2=Min(Max(geom_qp_offset_intvl_log 2,0),log 2(Max points in a slice))

In the above processing, Min( ) is a function that returns the minimum value among the arguments, and Max( ) is a function that returns the maximum value among the arguments.

Examples of the processing using the value of geom_qp_offset_intvl_log 2 are described below.

First, PtnQpInterval is calculated as follows:

PtnQpInterval=1<<geom_qp_offset_intvl_log 2

Second, in decoding sequentially the position information of each point of the point cloud data in the predictive coding, the offset value of the quantization parameter used for the inverse quantization of the residual of the position information is decoded every PtnQpInterval points. In other words, in the case where the remainder obtained by dividing n by PtnQpInterval at the nth point to be decoded is zero, the offset value of the quantization parameter is decoded.

Third, a quantization parameter to be subject to the inverse quantization processing is calculated by adding all three values of the quantization parameter offset value, geom_base_qp, and geom_slice_qp_offset that will be described later.

Moreover, predictive coding is a technique to decode the position information of each point by adding the predicted value of the position information estimated on the decoding side and the residual of the position information transmitted from the encoding side. The details thereof are disclosed in Non Patent Literature 1 and omitted herein.

As described above, the geometry information decoding unit 2010 may be configured to decode the syntax that defines the interval for transmitting the offset value of the quantization parameter in such a way that the value of the syntax can be necessarily equal to or greater than "zero".

That is, the value of syntax that defines the interval for transmitting the offset value of the quantization parameter decoded by the geometry information decoding unit 2010 is configured to be "0" or more.

Such a configuration makes it possible to prevent an unrealizable bit stream in which the interval between nodes is negative from occurring.

Furthermore, as described above, in a case where the maximum number of nodes per slice or per data unit is defined as a specification constraint, the geometry information decoding unit 2010 may be configured to decode syntax defining an interval for transmitting the offset value of the quantization parameter in such a way that the value of the syntax can be necessarily equal to or less than the maximum number of nodes per slice or per data unit.

That is, the value of syntax defining the interval for transmitting the offset value of the quantization parameter decoded by the geometry information decoding unit 2010 may be configured to be equal to or less than the maximum number of nodes per slice or per data unit.

In this way, by defining the maximum value of the value that can be taken as the value of the syntax defining the interval for transmitting the offset value of the quantization parameter, it is possible to define the maximum value of the number of bits required for decoding of such syntax, which helps to define the maximum value of the bit length of the entire GPS.

In addition, by constraining the maximum value of the syntax to be equal to or less than the maximum number of nodes per slice or per data unit, it is possible to prevent an effectively meaningless bit stream in which the interval between the nodes is equal to or more than the maximum number of nodes per slice or per data unit.

When carrying out the inverse quantization, in a case where the Predictive coding is not used (in the case where Octree is used) and the Direct coding mode is used, i.e., for example, in a case where the value of geom_scaling_enabled_flag is "1", the value of geom_tree_type is "0", and the value of inferred_direct_coding_mode_enabled_flag is "1", the GPS 2011 may further include an offset value (geom_direct_coding_mode_qp_offset) of the quantization parameter in the Direct coding mode.

In a case where the GPS 2011 does not include geom_direct_coding_mode_qp_offset, the geometry information decoding unit 2010 may be configured to recognize a value of geom_direct_coding_mode_qp_offset as "0".

FIG. 5 is an exemplary syntax configuration of GSHs 2012A and 2012B. Hereinafter, GSHs 2012A and 2012B are collectively referred to as GSHs 2012.

Note that the syntax names described below are merely examples. The syntax names may be different as long as the functions of the syntax described below are similar.

GSH 2012 may include syntax (gsh_geometry_parameter_set_id) for identifying a GPS corresponding to the GSH.

In the case where it is defined that Octree is used in the corresponding GPS, that is, for example, in the case where the value of geom_tree_type is "0", GSH 2012 may include syntax (geom_tree_depth_minus1) used to indicate layers of a tree in number in decoding an octree.

For example, a value of geom_tree_depth_minus1 may be a value obtained by subtracting "1" from the actual number of layers, and the geometry information decoding unit 2010 may decode the final number of layers by adding "1" to the value of geom_tree_depth_minus1.

Furthermore, a constraint may be defined such that the range of the value that can be taken as syntax used to indicate layers of a tree in number in decoding an octree is "0" or more.

In a case where it is defined that "QtBt" is not used in the GPS, that is, in a case where the value of geom_tree_coded_axis_list_present_flag is "0", a constraint that the range of value that can be taken as this syntax is MaxRootNodeDimLog2−1 or less may be defined using a value obtained by taking a logarithm with a base of 2 for the maximum value of the node size defined for each profile or level (for example, "MaxRootNodeDimLog2" of Non patent Literature 1).

In a case where it is defined that "QtBt" is used in the GPS, that is, in a case where the value of geom_tree_coded_axis_list_present_flag is "1", a constraint that the range of value that can be taken as this syntax is MaxRootNodeDimLog2−1+N (N is a natural number) or less may be defined using a value obtained by taking a logarithm with a base of 2 for the maximum value of the node size defined for each profile or level (for example, "MaxRootNodeDimLog2" of Non patent Literature 1). For example, the value of N may be "4". Alternatively, the maximum value may be defined as MaxRootNodeDimLog2+N. For example, the value of N may be "3".

Furthermore, after decoding the syntax such that the value of geom_tree_depth_minus1 is equal to or greater than "0" and equal to or less than "MaxRootNodeDimLog2−1+N", the geometry information decoding unit 2010 may perform the following clipping processing.

geom_tree_depth_minus1=Min(Max
(geom_tree_depth_minus1,0),MaxRootNodeDi-
mLog2−1+*N*)

In the above processing, Min( ) is a function that returns the minimum value among the arguments, and Max( ) is a function that returns the maximum value among the arguments.

As described above, in a case where the maximum node size per slice or per data unit is defined as a specification constraint, the geometry information decoding unit 2010 may be configured to decode the syntax used to indicate layers of a tree in number in decoding an octree in such a way that the value of the syntax can be necessarily equal to or less than a value obtained by adding a predetermined natural number to the maximum node size described above.

That is, the value of syntax used to indicate layers of a tree in number in decoding an octree to be decoded by the geometry information decoding unit 2010 may be configured to be equal to or less than a value obtained by adding a predetermined natural number to the maximum node size described above.

With such a configuration, the value of the above-described syntax can be defined within a minimum necessary range according to the maximum value of the node size defined for each profile or level, and the maximum value of the number of bits required for such syntax can be suppressed to the minimum necessary value.

In addition, as described above, the geometry information decoding unit 2010 may be configured to decode a flag used to indicate whether or not to apply QtBt, in a case where the flag indicates that the QtBt is applied, decode an octree in such a way that the value of syntax used to indicate layers of a tree in number in decoding an octree can be necessarily less than or equal to a value obtained by adding a predetermined natural number to the maximum node size described above, and in a case where the flag indicates that the QtBt is not applied, decode the octree in such a way that the value of syntax used to indicate layers of a tree in number in decoding an octree can be necessarily less than or equal to the maximum node size described above.

That is, in a case where the flag described above indicates that the QtBt is applied, the value of syntax used to indicate layers of a tree in number in decoding an octree decoded by the geometry information decoding unit 2010 may be configured to be less than or equal to a value obtained by adding a predetermined natural number to the maximum node size described above, and in a case where the flag indicates that the QtBt is not applied, the value of syntax used to indicate layers of a tree in number in decoding an octree decoded by the geometry information decoding unit 2010 may be configured to be less than or equal to the maximum node size described above.

With such a configuration, in a case where "QtBt" is applied, it is possible to suppress the maximum value of the total Depth numbers while giving a degree of freedom in selection of the axial direction dividing the node for each Depth, and it becomes easy to estimate the maximum processing amount in a case where an apparatus reflecting such a specification is mounted.

Furthermore, in a case where "QtBt" is not applied, by matching the maximum value of the number of nodes with the Depth number, the value of the syntax can be defined within a minimum necessary range, and the maximum value of the number of bits required for such syntax can be suppressed to the minimum necessary value.

GSH 2012 may include an offset value (geom_slice_qp_offset) of the quantization parameter in units of slices in a case where it is defined to subject position information to the inverse quantization in the GPS, that is, in a case where the value of geom_scaling_enabled_flag is "1", for example.

In a case where the GSH 2012 does not include geom_slice_qp_offset, the geometry information decoding unit 2010 may be configured to recognize a value of geom_slice_qp_offset as "0".

In a case where it is defined to subject position information to the inverse quantization in the GPS and in a case where the Octree is defined to be used in the GPS, that is, for example, in a case where the value of geom_scaling_enabled_flag is "1" and the value of geom_tree_type is "0", the GSH 2012 may include syntax (geom_octree_qp_offsets_depth) for defining layers of a tree (depth) using offset values of quantization parameters for the position information.

GSH 2012 may include syntax (log 2_trisoup_node_size) indicating a node size to which Trisoup is applied in a case where Trisoup is defined to be used in the GPS, that is, for example, in a case where the value of trisoup_enabled_flag is "1".

Such syntax may be defined as a value obtained by using the base-2 logarithm with respect to the node size to which Trisoup is applied.

Furthermore, a constraint may be defined such that the range of the value that can be taken as such syntax is "0" or more.

A constraint that the range of value that can be taken as this syntax is equal to or less than a value (for example, "MaxRootNodeDimLog2" of Non patent Literature 1) obtained by taking a logarithm with a base of 2 for the maximum value of the node size defined for each profile or level may be defined.

Furthermore, a constraint may be defined such that the range of possible value that can be taken as such syntax is equal to or less than a value obtained by taking a logarithm with a base of 2 for the root node size of the slice (alternatively, the data unit). The root node size can be calculated using, for example, geom_tree_coded_axis_flag as described in Non Patent Literature 1.

Furthermore, after decoding such syntax such that the value of log 2_trisoup_node_size is equal to or greater than "0" and equal to or less than the root node size, the geometry information decoding unit 2010 may perform the following clipping processing.

log 2_trisoup_node_size=Min(Max(log 2_
trisoup_node_size,0),log 2(RootNodeSize))

In the above processing, Min( ) is a function that returns the minimum value among the arguments, and Max( ) is a function that returns the maximum value among the arguments. In addition, RootNodeSize is a variable representing the root node size.

As described above, the geometry information decoding unit 2010 may be configured to decode the syntax indicating the node size to which Trisoup is applied in such a way that the value of the syntax can be necessarily equal to or less than the maximum node size of the slice or the data unit.

That is, the value of syntax indicating the node size to which Trisoup decoded by the geometry information decoding unit 2010 is applied may be configured to be equal to or less than the maximum node size of the slice or the data unit.

With such a configuration, the value of the above-described syntax can be defined within a minimum necessary range according to the maximum value of the node size defined for each profile or level, and the maximum value of the number of bits required for such syntax can be suppressed to the minimum necessary value.

As described above, the geometry information decoding unit 2010 may be configured to decode the syntax indicating the node size to which Trisoup is applied in such a way that the value of the syntax can be necessarily equal to or less than the root node size of the slice or the data unit.

That is, the value of syntax indicating the node size to which Trisoup decoded by the geometry information decoding unit 2010 is applied may be configured to be equal to or less than the root node size of the slice or the data unit.

With such a configuration, the value of the above-described syntax can be defined within a minimum necessary range according to the root node size for each slice or data unit, and the maximum value of the number of bits required for such syntax can be suppressed to the minimum necessary value.

(Tree Synthesizing Unit 2020)

Figure 6:
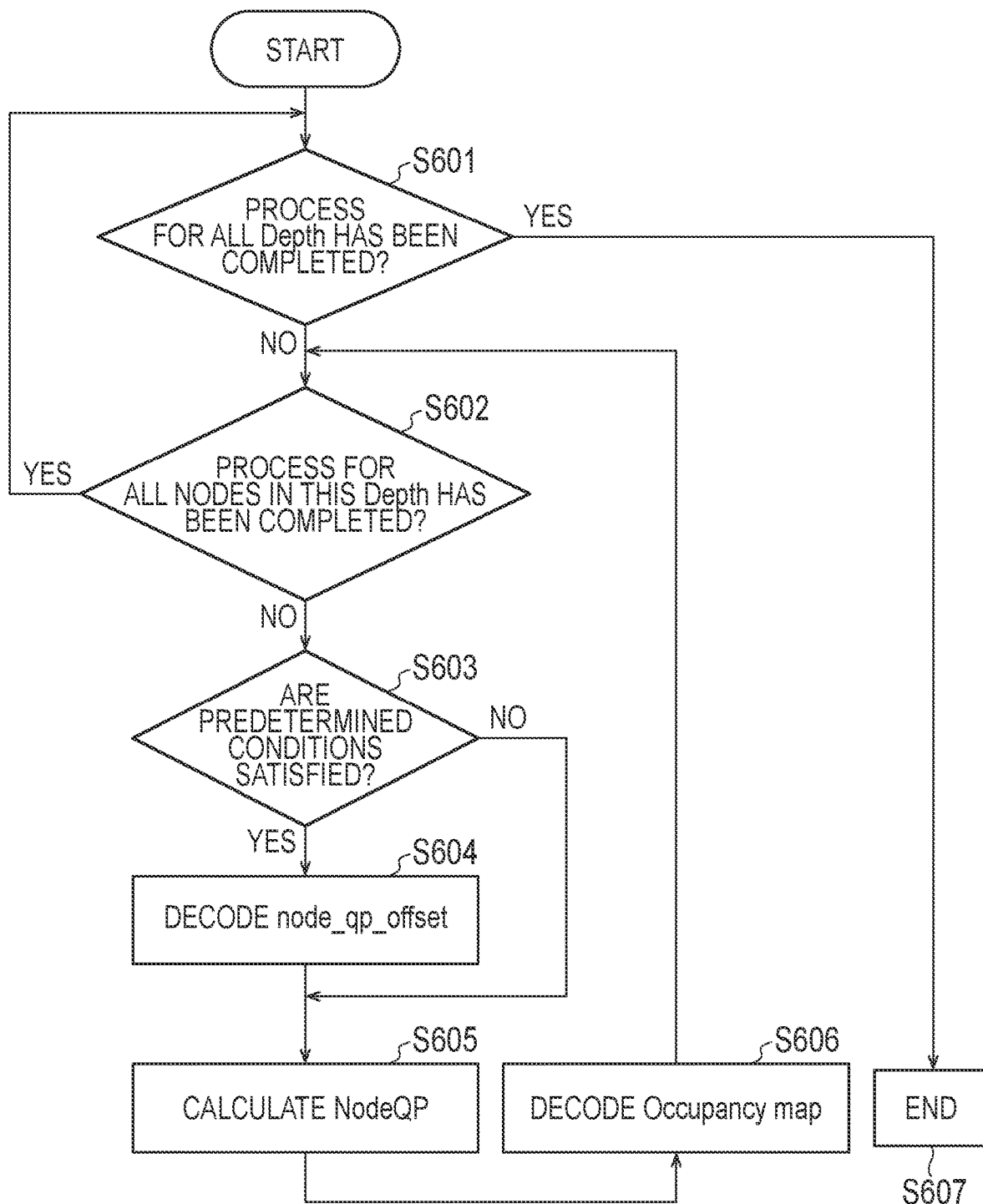
FIG. 6 is a flow chart illustrating an example of a process of a tree synthesizing unit 2020 of the point cloud decoding device 200 according to the embodiment.

An example of processing of the tree synthesizing unit 2020 will be described with reference to FIG. 6. FIG. 6 is a flowchart illustrating an example of processing of the tree synthesizing unit 2020.

As illustrated in FIG. 6, in step S601, regarding a tree structure in a case where "Octree" or "QtBt" is applied, the tree synthesizing unit 2020 checks whether or not a process for all Depth has been completed.

The value of Depth of the slice is, for example, the number of layers decoded from geom_tree_depth_minus1 transmitted by GSH. By comparing the value of Depth of the slice and the value of Depth having already been processed, the tree synthesizing unit 2020 can determine whether or not a process for all Depth has been completed.

In a case where a process for all Depth has been completed, the tree synthesizing unit 2020 proceeds to the process in step S607, leading to processing termination. Meanwhile, in a case where a process for all Depth has not been completed, the tree synthesizing unit 2020 proceeds to the process in step S602.

In step S602, the tree synthesizing unit 2020 determines whether or not a process for all nodes in the Depth has been completed.

The number of nodes included in the Depth can be calculated from a result of the node information decoding process (step S606) based on Depth processed immediately before. The number of nodes included in Depth to be processed first is one.

In a case where a process for all the nodes included in the Depth have been completed, the tree synthesizing unit 2020 goes back to the process in step S601.

Meanwhile, in a case where a process for all the nodes have not been completed, the tree synthesizing unit 2020 proceeds to the process in step S603.

In step S603, the tree synthesizing unit 2020 determines whether or not to decode nodeQpOffset used in the process in step S605 in the subsequent stage.

In a case where all the predetermined conditions are satisfied, the tree synthesizing unit 2020 proceeds to the process in S604 and decodes nodeQpOffset. On the other hand, in a case where at least one predetermined condition set in advance is not satisfied, the tree synthesizing unit 2020 skips decoding nodeQpOffset and proceeds to the process in step S605.

Such a predetermined condition may include a condition that the value of Depth is equal to GeomScalingDepth.

The value of GeomScalingDepth may be set according to, for example, whether or not it is defined to subject position information to the inverse quantization in the GPS.

The definition can be given such that the value of GeomScalingDepth is the same value as geom_octree_qp_offsets_depth if the value of geom_scaling_enabled_flag is "1", and the value of GeomScalingDepth is "0" if the value of geom_scaling_enabled_flag is "0".

Furthermore, the predetermined condition may include a condition that it is defined to subject position information to the inverse quantization in the GPS, that is, for example, a condition that the value of geom_scaling_enabled_flag is "1".

In step S604, the tree synthesizing unit 2020 decodes nodeQpOffset.

Here, first, the tree synthesizing unit 2020 decodes syntax (geom_node_qp_offset_eq0_flag) indicating whether a value of nodeQpOffset is "0".

Secondly, in a case where a value of geom_node_qp_offset_eq0_flag is "0", the tree synthesizing unit 2020 additionally decodes syntax (geom_node_qp_offset_sign_flag) indicating a code (plus or minus) of nodeQpOffset and syntax (geom_node_qp_offset_abs_minus1) indicating an absolute value of nodeQpOffset.

Thirdly, the tree synthesizing unit 2020 decodes the value of nodeQpOffset using the syntax decoded as described above. In a case where the value of geom_node_qp_offset_eq0_flag is "1", the tree synthesizing unit 2020 sets the value of nodeQpOffset to "0". In a case where the value of geom_node_qp_offset_eq0_flag is "0", the tree synthesizing unit 2020 performs decoding as follows $$nodeQpOffset=(2\times geom\_node\_qp\_offset\_sign\_flag-1)\times(geom\_node\_qp\_offset\_abs\_minus1+1)$$

Note that if the process of step S604 is skipped, that is, if geom_node_qp_offset_eq0_flag is not decoded, the tree synthesizing unit 2020 may recognize the value of geom_node_qp_offset_eq0_flag as "1". That is, in a case where the process of step S604 is skipped, the tree synthesizing unit 2020 may recognize the value of nodeQpOffset as "0".

As described above, the tree synthesizing unit 2020 may be configured to decode a flag used to indicate whether or not to subject position information to the inverse quantization from a bit stream, and set the value of the offset value nodeQpOffset of the quantization parameter for each node to "0" in a case where the flag indicates that the position information is not subjected to the inverse quantization.

With such a configuration, in a case where inverse quantization is not carried out, the value of nodeQpOffset can be always set to "0", and it becomes easy to ensure that a value of NodeQp to be described later becomes "0", that is, a value not to be subject to inverse quantization.

Furthermore, as described above, in a case where the flag used to indicate whether or not to subject position information to the inverse quantization indicates that the position information is not subjected to the inverse quantization, the tree synthesizing unit 2020 may be configured to omit the above-described decoding processing of syntax related to nodeQpOffset.

With such a configuration, in a case where the inverse quantization of the position information is not carried out, unnecessary decoding processing can be avoided, and the processing amount can be reduced.

Further, as described above, the tree synthesizing unit 2020 may be configured such that the tree synthesizing unit decodes a flag used to indicate whether or not the value of nodeQpOffset used as one of the syntaxes regarding the nodeQpOffset is "0" and recognizes a value of the flag as a value indicating that the value of nodeQpOffset is "0" in a case where processing of decoding the flag is skipped.

With such a configuration, is a case where decoding is omitted for the flag used to indicate whether or not a value of nodeQpOffset is "0", that is, in a case where inverse quantization is not carried out, the value of nodeQpOffset can be always set to "0", and it becomes easy to ensure that the value of NodeQp to be described later becomes "0", that is, a value not to be subject to inverse quantization.

After decoding the value of nodeQpOffset by the above procedure, the tree synthesizing unit 2020 proceeds to step S605.

In step S605, the tree synthesizing unit 2020 decodes the value of NodeQp.

First, in a case where the current depth is equal to GeomScalingDepth, the tree synthesizing unit 2020 may calculate the value of NodeQp by the following formula.

$$NodeQp=(geom\_base\_qp+geom\_slice\_qp\_offset+nodeQpOffset)\texttt{<<}geom\_qp\_multiplier\_log\ 2$$

Here, in a case where it is defined that the inverse quantization of the position information is not carried out in the GPS, that is, in a case where the value of geom_scaling is "0", it may be defined that the value of NodeQp is "0".

In a case where it is defined not to subject position information to the inverse quantization in the GPS, that is, in a case where the value of geom_scaling_enabled_flag is "0", each value of geom_base_qp, geom_slice_qp_offset, and nodeQpOffset may be defined to be "0".

A conformance constraint that the value of NodeQp can be necessarily 0 or more may be defined for the bit stream.

Furthermore, the tree synthesizing unit 2020 may calculate NodeQp by the following formula so that the value of NodeQp can be necessarily 0 or more.

$$NodeQp=Max(geom\_base\_qp+geom\_slice\_qp\_offset+nodeQpOffset,0)\texttt{<<}geom\_qp\_multiplier\_log\ 2$$

Here, Max ( ) is a function that returns the largest value among the arguments.

Secondly, in a case where the current depth is larger than GeomScalingDepth, the tree synthesizing unit 2020 may define the value of NodeQp as the same value as the parent node of the node, that is, NodeQp used when the depth is smaller by one than the node.

Thirdly, in a case where the current depth is smaller than GeomScalingDepth, the tree synthesizing unit 2020 may calculate the value of NodeQp by the following formula.

$$dcmQp=(geom\_base\_qp+geom\_direct\_coding\_mode\_qp\_offset)\texttt{<}geom\_qp\_multiplier\_log\ 2$$

$$NodeQp=Min(minScalingNodeDimLog2\times 8,dcmQp)$$

Here, Min ( ) is a function that returns the smallest value among the arguments. Furthermore, minScalingNodeDimLog2 is a value obtained by taking a logarithm with a base of 2 with respect to the size in the axial direction having the smallest size among the three axial directions (for example, x axis, y axis, z axis) defining the node size at the depth.

Here, in a case where it is defined that the inverse quantization of the position information is not carried out in the GPS, that is, in a case where the value of geom_scaling_enabled_flag is "0", it may be defined that the value of NodeQp is "0".

In a case where it is defined not to subject position information to the inverse quantization in the GPS, that is, in a case where the value of geom_scaling_enabled_flag is "0", each value of geom_base_qp and geom_direct_coding_mode_qp_offset may be defined to be "0".

A conformance constraint that the value of NodeQp can be necessarily 0 or more may be defined for the bit stream.

That is, in a case where the value of NodeQp is less than "0", the tree synthesizing unit 2020 may determine that the bit stream violates the specification.

Furthermore, the tree synthesizing unit 2020 may calculate NodeQp by the following formula so that the value of NodeQp can be necessarily "0" or more.

$$NodeQp=Max(Min(minScalingNodeDimLog2\times 8,dcmQp),0)$$

NodeQp obtained as described above is used for inverse quantization processing of position information. The inverse quantization processing can be executed, for example, as follows. Note that, in a case where it is defined that the inverse quantization of the position information is not carried out in the GPS, that is, in a case where the value of geom_scaling_enabled_flag is "0", it may be configured such that the following inverse quantization processing is not carried out.

First, the tree synthesizing unit 2020 separates the coordinate value val (any of x component, y component, and z component) of the node before inverse quantization into highPart and lowPart as follows.

$$highPart=val\texttt{>>}(ScalingNodeSizeLog2[cIdx]-scalingExpansionLog2)$$

$$lowPart=val\&((1\texttt{<<}(ScalingNodeSizeLog2[cIdx]-scalingExpansionLog2))-1)$$

Here, ScalingNodeSizeLog2[cIdx] is a value obtained by taking a logarithm with base 2 for the node size before quantization in the axial direction (any of x direction, y direction, and z direction) corresponding to a value of cIdx. Furthermore, scalingExpansionLog2 is a value obtained by dividing NodeQp by an integer of 8. That is, scalingExpansionLog2 is a value obtained by dividing NodeQp by 4 and then rounding down decimal places of the obtained quotient to an integer.

Secondly, the tree synthesizing unit 2020 calculates the scale factor sF by the following formula.

$$sF=8+(qP\&7)\texttt{<<}qP/8$$

Here, a value of qP is the same as NodeQp. Furthermore, & is an operator for calculating a logical product for each bit. That is, qP&3 is equivalent to the processing of extracting the lower two digits in a case where the value of qP is expressed by a binary number.

Note that, as described above, in a case where the logical product is obtained with the value of qP or in a case where it is defined to perform the bit shift according to the value calculated from qP, the value of qP, that is, the value of NodeQp is expected to be an integer of "0" or more.

Thirdly, the tree synthesizing unit 2020 calculates the coordinate value pos after inverse quantization by the following formula.

$$highPartS=highPart\texttt{<<}ScalingNodeSizeLog2[cIdx]$$

$$lowPartS=(lowPart\times sF+4)\texttt{>>}3$$

$$pos=highPartS|Min(lowPartS,(1\texttt{<<}ScalingNodeSizeLog2\text{"}cIdx\text{"})-1)$$

Here, | is an operator for obtaining a logical sum in units of bits.

In the above inverse quantization processing, in a case where the value of qP, that is, the value of NodeQp is "0", the input value val and the output value pos have the same value. Note that, in a case where it is defined that the inverse quantization of the position information is not carried out in the GPS, that is, for example, in a case where the value of geom_scaling_enabled_flag is "0", the above inverse quantization processing may be skipped. Further, as described above, in a case where it is defined that the inverse quantization of the position information is not carried out in the GPS, that is, for example, in a case where the value of geom_scaling_enabled_flag is "0", the value of NodeQp may be defined to be necessarily "0".

As described above, the tree synthesizing unit 2020 may be configured to perform decoding such that the value of the quantization parameter NodeQp for each node can be necessarily equal to or greater than the predetermined value or greater than the predetermined value.

For example, in a case where it is assumed that the value of NodeQp is equal to or greater than the predetermined value or greater than the predetermined value in the subsequent processing, the consistency of the entire decoding processing can be maintained by adopting such a configuration.

Furthermore, as described above, the tree synthesizing unit 2020 may be configured to perform the clipping processing after calculating the value of NodeQp so that the value of NodeQp is equal to or greater than the predetermined value or greater than the predetermined value.

With such a configuration, regardless of the value of the parameter value such as geom_base_qp, the value of NodeQp can be guaranteed to be necessarily equal to or greater than the predetermined value or greater than the predetermined value.

In addition, the tree synthesizing unit 2020 may be configured to determine that the value of NodeQp violates a specification in a case where the value of NodeQp is less than the predetermined value or equal to or less than the predetermined value.

With such a configuration, it is possible to guarantee that the value of NodeQp becomes greater than or equal to a predetermined value or greater than the predetermined value as long as it is a bit stream conforming to the specification without using additional processing such as clipping.

As described above, the predetermined value may be set to "0".

For example, in a case where it is assumed that the value of NodeQp is equal to or greater than "0" in the subsequent processing, the consistency of the entire decoding processing can be maintained by adopting such a configuration.

Furthermore, when the value of NodeQp is "0" and the processing result is the same as that in a case where the inverse quantization processing is not carried out, it is possible to determine whether or not it is necessary to carry out the inverse quantization processing only with the value of NodeQp by including "0" in the value range of NodeQp.

After calculating NodeQp as described above, the tree synthesizing unit 2020 proceeds to step S606.

In step S606, the tree synthesizing unit 2020 divides the node into eight child nodes in a case where "Octree" is used or divides the node into eight child nodes, four child nodes, or two child nodes in a case where "QtBt" is used. Based on information of Occupancy code or the like, the tree synthesizing unit 2020 decodes Occupancy map indicating whether or not the point cloud data is included in each child node.

For example, when the value of Occupancy map is "1", it can be defined that the point cloud data is present in the corresponding child node. For example, when the value of Occupancy map is "0", it can be defined that no point cloud data is present in the corresponding child node or it can be defined that the child node itself is not present.

Therefore, the tree synthesizing unit 2020 counts the number of child nodes of which the value of Occupancy map is "1" in the same Depth, so that the number of nodes in Depth to be processed next can be acquired.

When generation of Occupancy map is completed for one node, the tree synthesizing unit 2020 goes back to the process in step S602.

(Attribute-Information Decoding Unit 2060)

Control data that the attribute-information decoding unit 2060 decodes will be described below with reference to FIGS. 7 and 9.

Figure 7:
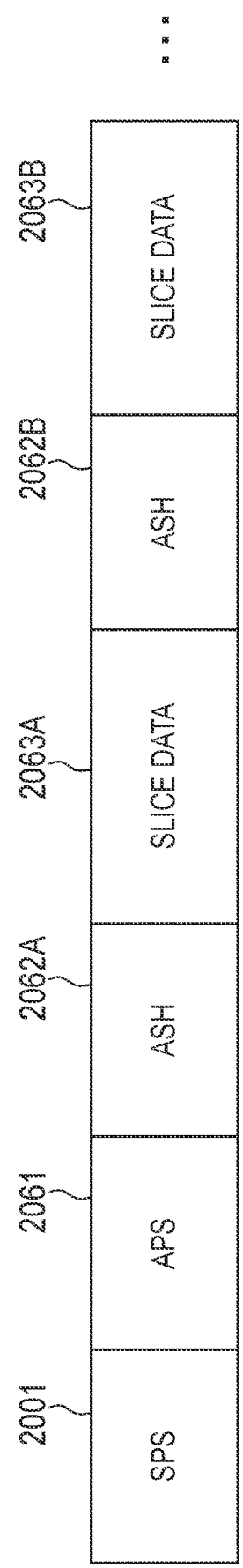
FIG. 7 is an exemplary configuration of encoded data (bit stream) received by an attribute-information decoding unit 2060 of the point cloud decoding device 200 according to the embodiment.

FIG. 7 is a configuration example of encoded data (bit stream) received by the attribute-information decoding unit 2060.

First, the bit stream may include APS 2061. The APS 2061 is also called an attribute parameter set and is an aggregate of control data regarding decoding of attribute information. A specific example will be described later. Each APS 2061 includes at least APS id information for individual identification in a case where plural pieces of APS 2061 are present.

Secondly, the bit stream may include ASH 2062A/2062B. The ASH 2062A/2062B are also called attribute slice headers and are aggregates of control data corresponding to later-described slices. A specific example will be described later. The ASH 2062A/2062B includes at least APS id information for specifying the APS 2061 corresponding to the ASH 2062A/2062B.

Thirdly, the bit stream may include slice data 2063A/2063B subsequent to the ASH 2062A/2062B. The slice data 2063A/2063B includes encoded data of attribute information.

As above, the bit stream is configured such that the ASH 2062A and the APS 2061 correspond to the slice data 2063A and the ASH 2062B and the APS 2061 correspond to the slice data 2063B.

As described above, since which APS 2061 is to be referenced is specified with the APS id information in the ASH 2062A/2062B, the common APS 2061 can be used for the plural pieces of slice data 2063A/2063B.

In other words, the APS 2061 is not necessarily required to be transmitted for each slice. For example, as in FIG. 7, the bit stream can be configured such that the APS 2061 is not encoded immediately before the ASH 2062B and the slice data 2063B.

Note that the configuration of FIG. 7 is just exemplary. As long as the ASH 2062A/2062B and the APS 2061 correspond to the slice data 2063A/2063B, an element other than those described above may be added as a constituent element of the bit stream. For example, as illustrated in FIG. 7, the bit stream may include a sequence parameter set (SPS).

Similarly, for transmission, the bit stream may be brought into a configuration different from that of FIG. 7. Furthermore, the bit stream may be synthesized with the bit stream that the geometry information decoding unit 2010 decodes, for transmission of a single bit stream. For example, the pieces of slice data 2013A and 2063A may be treated as a single piece of slice data, and the pieces of slice data 2013B and 2063B may be treated as a single piece of slice data. The GSH 2012A and the ASH 2062A may be disposed immediately before the corresponding slice, and the GSH 2012B and the ASH 2062B may be disposed immediately before the corresponding slice. In such a case, the GPS 2011 and the APS 2061 may be disposed before all GSH and ASH.

FIG. 8 is an example of a syntax configuration of SPS 2001.

The SPS 2001 may include a syntax (level_idc) defining a level.

The SPS 2001 may include an index (sps_seq_parameter_set_id) for identifying a plurality of SPSs.

The SPS 2001 may include syntax (sps_num_attribute_sets) indicating the number of pieces of attribute information included in the bit stream.

The SPS 2001 may include syntax (attribute_dimension_minus1[i]) indicating the dimension number of each of sps_num_attribute_sets pieces of attribute information included in the bit stream. A case where the dimension number is "1" corresponds to a case where the attribute information is, for example, a reflectance or a luminance signal. In addition, a case where the dimension number is "3" corresponds to a case where the attribute information is dimensional data including, for example, a luminance signal and chroma signals (Cb signal, Cr signal).

Here, when all the dimension number of the sps_num_attribute_sets pieces of attribute information are "1", it can be seen that chroma data is not included in the bit stream. Therefore, when all the dimension number of the sps_num_attribute_sets pieces of attribute information is "1", a value of attr_secondary_dim_present_flag may be defined as "0".

Further, when the dimension number is "2" or more for at least one piece of attribute information, the value of attr_secondary_dim_present_flag may be defined as "1".

Note that, in the above, an example has been described in which the value of attr_secondary_dim_present_flag, which is a flag indicating whether or not the chroma data is included in the bit stream, is set with reference to the dimension number of the attribute information. However, other methods may be used for determining the presence or absence of the chroma data.

For example, syntax indicating a type of attribute information may be decoded, and, for example, when they all indicate "reflection coefficients", it may be determined that chroma data is not included in the bit stream, and the value of attr_secondary_dim_present_flag may be defined as "0".

Further, the value of attr_secondary_dim_present_flag may be included in the bit stream, and the value of the flag is decoded from the bit stream so that it may determine whether or not the chroma data is included in the bit stream. That is, when the value of attr_secondary_dim_present_flag decoded from the bit stream is "0", it may be determined that the chroma data is not included in the bit stream.

FIG. 9 is an example of a syntax configuration of APS 2061.

The APS 2061 may include APS id information (aps_attr_parameter_set_id) for identifying the APS 2061.

The APS 2061 may include information (attr_coding_type) indicating a method of decoding the attribute information. For example, it may be defined that: when a value of attr_coding_type is "0", the inverse lifting unit 2100 carries out variable weighted lifting prediction; when the value of attr_coding_type is "1", the RAHT unit 2080 carries out RAHT; and when the value of attr_coding_type is "2", the inverse lifting unit 2100 carries out lifting prediction with a fixed weight.

When the value of attr_secondary_dim_present_flag is "1", the APS 2061 may include an offset value (aps_attr_chroma_qp_offset) of the quantization parameter of the chroma signal.

When aps_attr_chroma_qp_offset is not included in APS 2061, the attribute-information decoding unit 2060 may be defined to recognize a value of aps_attr_chroma_qp_offset as "0".

When the value of attr_secondary_dim_present_flag is "1" and the value of attr_coding_type is "2", the APS 2061 may include a flag (lifting_last_component_prediction_enabled_flag) used to control whether or not to perform prediction of a residual between chroma signals.

The definition can be given such that the residual between the chroma signals is predicted if a value of lifting_last_component_prediction_enabled_flag is "1", and the residual between the chroma signals is not predicted if the value of lifting_last_component_prediction_enabled_flag is "0".

The definition can be given such that if lifting_last_component_prediction_enabled_flag is not included in the APS 2061, the attribute-information decoding unit 2060 recognizes the value of lifting_last_component_prediction_enabled_flag as "0".

When the value of attr_secondary_dim_present_flag is "1" and the value of attr_coding_type is "1", the APS 2061 may include a flag (inter_component_prediction_enabled_flag) used to control whether or not to perform prediction between the luminance signals and between the chroma signals.

The definition can be given such that the prediction is performed between the luminance signals and between the chroma signals if a value of inter_component_prediction_enabled_flag is "1", and the prediction is not performed between the luminance signals and between the chroma signals if the value of inter_component_prediction_enabled_flag is "0".

When inter_component_prediction_enabled_flag is not included in the APS 2061, the attribute-information decoding unit 2060 may be defined to recognize the value of inter_component_prediction_enabled_flag as "0".

As above, the attribute-information decoding unit 2060 may be configured to determine whether or not a chroma signal is included in a bit stream, and if the chroma signal is determined not to be included, then to avoid decoding for syntax regarding the chroma signal.

With such a configuration, unnecessary decoding of the syntax can be avoided, and the processing amount can be reduced.

As above, the attribute-information decoding unit 2060 may be configured to decode dimension number of the attribute information included in the bit stream, and if the decoded dimension number of the entire attribute information is "1", then to determine that the chroma signal is not included in the bit stream.

With such a configuration, processing regarding the chroma signals can be avoided in a case where the bit stream includes only reflection coefficients (one dimension) or only luminance signals (one dimension).

As above, the attribute-information decoding unit 2060 may be configured to, if the offset value of the quantization parameter of the chroma signal is not decoded, recognize a value of the syntax as "0".

With such a configuration, it is possible to prevent an unnecessary offset value from being unintentionally set when there is no chroma signal.

As above, the attribute-information decoding unit 2060 may be configured, if the flag used to control whether or not to perform prediction of a residual between the chroma signals is not decoded, to recognize the flag as having an identical value to a case where the prediction of a residual is not performed between the chroma signals.

With such a configuration, it is possible to prevent an unnecessary prediction of a residual from being carried out between the chroma signals when there is no chroma signal.

As above, the attribute-information decoding unit 2060 may be configured, if the flag used to control whether or not to perform prediction between the luminance signals and between the chroma signals is not decoded, to recognize the flag as having an identical value to a case where the prediction is not performed between the luminance signals and between the chroma signals.

With such a configuration, it is possible to prevent an unnecessary prediction of a residual from being carried out between the luminance signals and between the chroma signals when there is no chroma signal.

The APS 2061 may include a flag (lifting_scalability_enabled_flag) indicating whether or not scalable lifting is to be applied.

It may be defined that, when a value of lifting_scalability_enabled_flag is "0", scalable lifting is not to be applied, and it may be defined that, when the value of lifting_scalability_enabled_flag is "1", scalable lifting is to be applied.

The APS 2061 may include syntax (lifting_num_detail_levels_minus1) specifying the level number of LoD that the LoD calculation unit 2090 calculates.

The value of LoD is required to be an integer value of 1 or more, and thus, for example, the syntax may have in advance an integer value of 0 or more, and the value resulting from addition of "1" to the value of the syntax may be set as the level number of LoD.

When the level number of LoD is larger than "1", that is, when a value of lifting_num_detail_levels_minus1 is larger than "0", the APS 2061 may include a flag (lifting_lod_regular_sampling_enabled_flag) indicating whether or not to sample points belonging to each LoD at equal intervals.

For example, the definition can be given such that sampling is performed at equal intervals when a value of lifting_lod_regular_sampling_enabled_flag is "1", and sampling is not performed at equal intervals when a value of lifting_lod_regular_sampling_enabled_flag is "0".

When sampling is performed at equal intervals, that is, when the value of lifting_lod_regular_sampling_enabled_flag is "1", the APS 2061 may include a syntax (lifting_sampling_period_minus2[idx]) specifying a sampling interval for each level of LoD.

The sampling interval may be an integer of 2 or more, and a value of lifting_sampling_period_minus2[idx] may be defined as a number obtained by subtracting 2 from the actual sampling interval. Here, a constraint that the range of possible values of this syntax is zero or more may be defined.

In addition, as the range of possible values of such syntax, a constraint that the number of nodes included in one slice (a single data unit) defined for each profile or level is equal to or less than the maximum value (e.g., "Max points in a slice" disclosed in Non Patent Literature 1) may be defined.

As described above, when the value of lifting_sampling_period_minus2[idx] is defined as the number obtained by subtracting 2 from the actual sampling interval, a constraint that the value is equal to or less than the value obtained by subtracting 2 from the "Max points in a slice" may be defined.

Further, the attribute-information decoding unit 2060 may perform the following clipping processing after decoding the syntax such that the value of lifting_sampling_period_minus2[idx] is equal to or greater than "0" and equal to or less than "Max points in a slice-2".

geom_qp_offset_intvl_log 2=Min(Max(lifting_sampling_period_minus2[idx],0),Max points in a slice-2)

In the above processing, Min( ) is a function that returns the minimum value among the arguments, and Max( ) is a function that returns the maximum value among the arguments.

As described above, the attribute-information decoding unit 2060 may be configured to decode the syntax that specifies a sampling interval for each level of LoD in such a way that the value of the syntax can be necessarily equal to or greater than "zero".

That is, the value of syntax that specifies a sampling interval for each level of LoD decoded by the attribute-information decoding unit 2060 is configured to be "0" or more.

Such a configuration makes it possible to prevent an unrealizable bit stream in which the interval between nodes is negative from occurring.

Furthermore, as described above, in a case where the maximum number of nodes per slice or per data unit is defined as a specification constraint, the attribute-information decoding unit 2060 may be configured to decode syntax specifying a sampling interval for each level of LoD in such a way that the value of the syntax can be necessarily equal to or less than the maximum number of nodes per slice or per data unit.

That is, the value of syntax specifying a sampling interval for each level of LoD decoded by the attribute-information decoding unit 2060 may be configured to be equal to or less than the maximum number of nodes per slice or per data unit.

In this way, by defining the maximum value of the value that can be taken as the value of the syntax specifying a sampling interval for each level of LoD, it is possible to define the maximum value of the number of bits required for decoding of such syntax, which helps to define the maximum value of the bit length of the entire GPS.

In addition, by constraining the maximum value that can be taken as the value of the syntax specifying a sampling interval for each level of LoD to be equal to or less than the maximum number of nodes per slice or per data unit, it is possible to prevent an effectively meaningless bit stream in which the interval between the nodes is equal to or more than the maximum number of nodes per slice or per data unit.

Further, the point cloud encoding device 100 and the point cloud decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

What is claimed is:

1. A point cloud decoding device, comprising:
a computer that is configured to:
decode a first flag used to indicate whether or not to use a planar mode from a bit stream,
recognize the first flag as having an identical value to a case of failing to use the planar mode in a case of non-inclusion of the first flag in the bit stream, and
decode a second flag in a case where the first flag indicates that the planar mode is to be used, the second flag being used to control whether or not to perform a nearest neighbor node search using a buffer in decoding information regarding the planar mode.

2. The point cloud decoding device according to claim 1, wherein when the computer does not decode the second flag, the computer is configured to recognize the second flag as having an identical value to a case of failing to perform the nearest neighbor node search using the buffer in decoding the information regarding the planar mode.

3. A point cloud decoding method, comprising:
decoding a first flag used to indicate whether or not to use a planar mode from a bit stream;
recognizing the first flag as having an identical value to a case of failing to use the planar mode in a case of non-inclusion of the first flag in the bit stream; and
decoding a second flag in a case where the first flag indicates that the planar mode is to be used, the second flag being used to control whether or not to perform a nearest neighbor node search using a buffer in decoding information regarding the planar mode.

4. A non-transitory computer-readable medium having stored thereon a program that is executable by a computer of a point cloud decoding device to cause the computer to perform functions comprising:
decoding a first flag used to indicate whether or not to use a planar mode from a bit stream;
recognizing the first flag as having an identical value to a case of failing to use the planar mode in a case of non-inclusion of the first flag in the bit stream; and
decoding a second flag in a case where the first flag indicates that the planar mode is to be used, the second flag being used to control whether or not to perform a nearest neighbor node search using a buffer in decoding information regarding the planar mode.

* * * * *